April 17, 1928. 1,666,769
R. B. BEISEL ET AL
AIRPLANE
Filed March 24, 1924  3 Sheets-Sheet 2

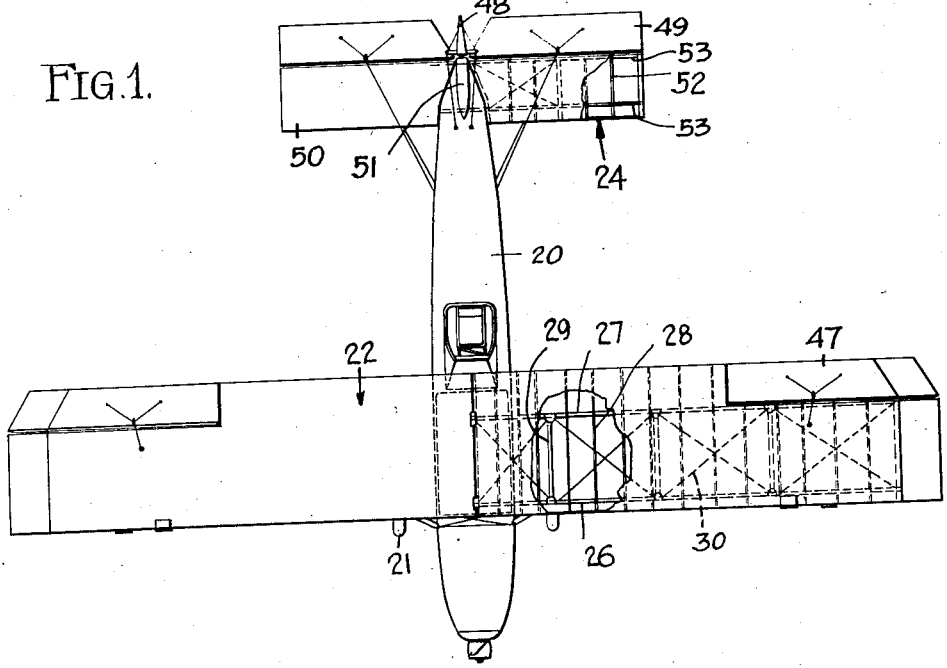
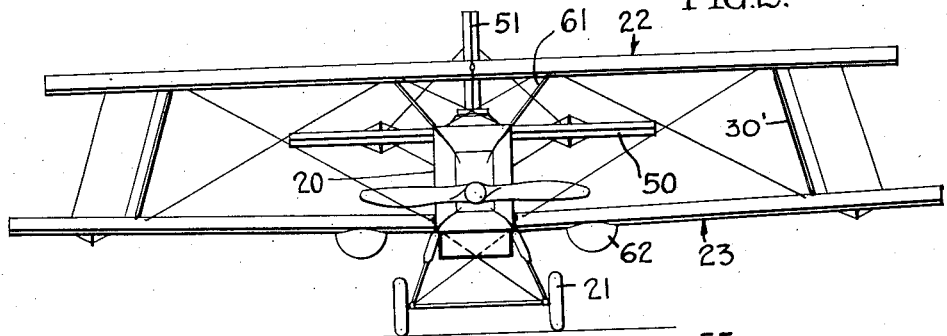
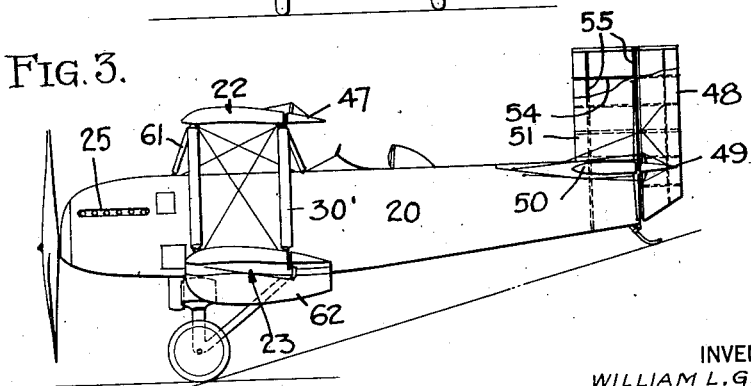

INVENTORS
WILLIAM L. GILMORE.
REX B. BEISEL.
BY
ATTORNEY

April 17, 1928.

R. B. BEISEL ET AL 1,666,769

AIRPLANE

Filed March 24, 1924     3 Sheets-Sheet 3

INVENTORS
WILLIAM L. GILMORE.
REX. B. BEISEL.
BY
ATTORNEY

Patented Apr. 17, 1928.

1,666,769

UNITED STATES PATENT OFFICE.

REX B. BEISEL, OF GARDEN CITY, AND WILLIAM L. GILMORE, OF MINEOLA, NEW YORK, ASSIGNORS TO CURTISS AEROPLANE & MOTOR COMPANY, INC., A CORPORATION OF NEW YORK.

AIRPLANE.

Application filed March 24, 1924. Serial No. 701,338.

Our invention relates to airplanes and more particularly to improvements in airplane design and construction as distinguished from improvements in the operation of the machine.

Heretofore in the design of an airplane no consideration whatsoever has been given the possibility of greatly reducing the number of differently formed and differently constructed airplane parts required to be made for the production of a completely equipped and wholly operative machine. As a consequence, airplane service stations, in attempting to render adequate service for a given design of airplane, are required, at all times, to keep in stock one or more differently formed and differently constructed airplane parts for each separate structural item embodied in said design.

To overcome the above objectionable condition, and to reduce, at the same time, the production cost of airplanes of a given design, the present invention contemplates duplicating, wherever possible, certain essential airplane parts—i. e., so forming, constructing and dimensioning said parts as to admit of an interchange thereof without in any way altering the design or operation of the machines considered as a whole.

By the present invention, it is proposed in the above connection, to so form, construct and dimension, the wing panels of a biplane or multi-plan that one type panel, as a service item or spare, can be used with equal facility and correctness as either an upper, lower or intermediate panel as need therefor may arise. It is further proposed to so design and dimension the control surfaces, to wit; the ailerons, rudder and elevators, as to admit of its or their replacement by any one or more of a number of duplicate or identically formed and constructed aerofoil spares. The wing beams, front and rear, of all wing panels are also constructed and dimensioned alike, as are the wing struts, the ribs comprised in the stabilizing fins, etc.; such duplication or interchangeability tending, in every instance, to improve, simplify and render less costly complete service and at the same time tending, in every instance, to simplify the construction and reduce production cost of said given design of machine.

Airplanes characterized as above set forth are especially suited to commercial use, mail planes, as an instance of utility, being predominate. Obviously, to render dependable mail delivery by airplane, airplane service stations, fully stocked, are essential, and since the cost of service is greatly reduced and its adequacy assured, the improvements herein contemplated are factors of real importance in the onward development of the commercial type machine.

Other objects, advantages and improved results will be hereinafter explained.

In the drawings, wherein like reference characters denote like or corresponding parts, Fig. 1 is a plan view of an airplane, with a portion of the covering of one of the wing panels and a portion of the covering of one of the stabilizing fins, partly removed;

Fig. 2 is a front elevation of said machine;

Fig. 3 is a side elevation;

Figure 4:
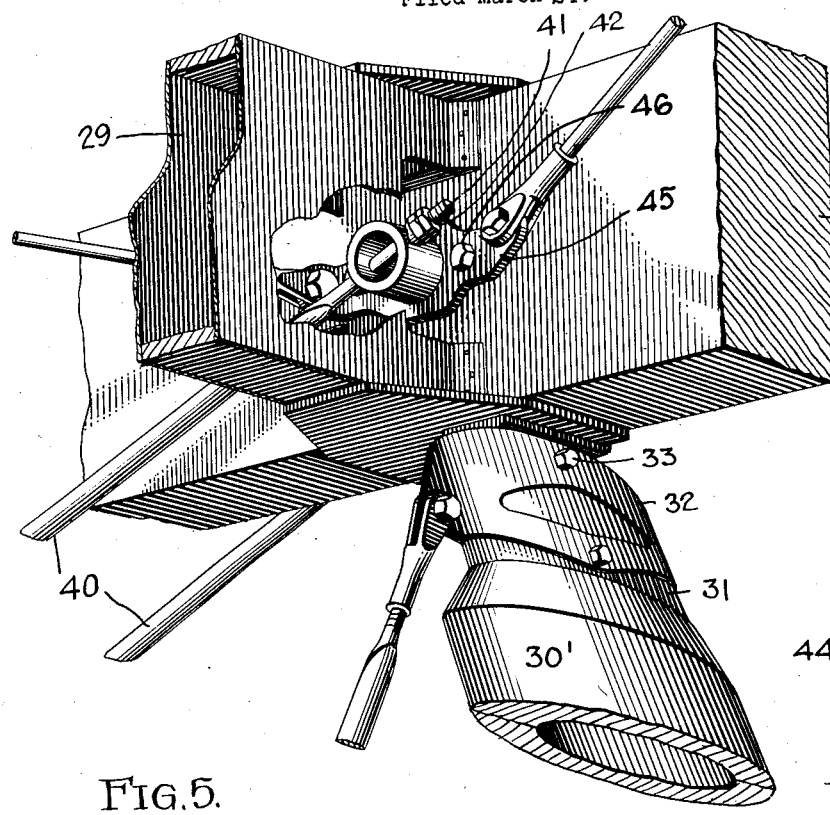
Fig. 4 is a detail perspective view of one of the wing strut fittings.

As intimated, the airplane is in many respects of more or less conventional design. In the embodiment of the invention selected for illustration a biplane is disclosed. Said biplane comprises the usual fuselage or body 20, landing gear 21, upper supporting surface 22, lower supporting surface 23, empennage 24 and power plant 25, all of said parts being dimensioned over-all and arranged in accordance with the accepted theory of a typical commercial machine. Both the upper and lower supporting surfaces, however, instead of comprising a plurality of wing panels of different size and construction, comprise a like number of panels, the corresponding panels in each instance being identical in form, shape and dimensions. Each said panel, in the preferred embodiment, comprises a forward wing beam 26, a rear wing beam 27, ribs 28, compression struts 29 and internal brace wires 30. The ribs in each instance are constructed in duplicate as are the compression members 29. Of more importance, however, is the construction of the wing beams 26 and 27. Said wing beams 26 and 27, in each corresponding panel, i. e., right or left, and regardless of whether such panel is an upper or lower, are identical in size and construction, such duplication admitting of an interchange of said beams without altering in any way the size, shape or design of any given panel. Not only are the beams 26 and 27 thus interchangeable but the struts 30 (both front and rear) which interconnect the upper and lower supporting surfaces are interchangeable as well. Due to the difference in span of the upper and lower supporting surfaces the struts 30, in each instance, are inclined inwardly toward their upper ends, such inclination bringing the strut points in the wing beams at corresponding points with respect to their overall length. Preferably the said struts 30 are hollow throughout, and at their opposite ends are reduced as at 31, such reduced end portions, in cross section, defining a true ellipse. Over the reduced end portions 31 of each strut 30 a socket 32 is placed, such socket being held in place by a thru-bolt 33 which not only penetrates the socket walls, but in addition penetrates an enlarged head portion 34 of the strut fastening bolt 35. The bolts 35, at the opposite ends of each strut 30 are carried into the wing beams of the supporting surfaces, where the said struts are fastened, each said bolt being anchored as hereinafter more fully explained.

Ordinarily, a slight difference in strut length exists between front and rear struts due to the difference in thickness of the wings at or near their leading and trailing edges. In the present invention such a difference in thickness does not exist and the struts in each instance are of equal length, and since their ends are reduced symmetrically, any one strut can be used with equal facility and correctness, either front or rear, at any strut point in the machine. As an anchorage for the strut ends, bolts 36 are provided. Said bolts 36 are preferably hollow and are arranged to penetrate the wing beams at points along their neutral axes, each bolt at its opposite ends being extended laterally beyond the opposite faces of said beams. Within said bolts 36 plugs 37 are fastened as indicated at 38, each said plug having a threaded bore 39 formed therein to receive the inner threaded end of one of the strut fastening bolts 35. Being thus anchored said bolts 35 in addition so engage the bolts 36 as to prevent displacement thereof laterally relatively to the wing beam thru which it (the said bolt 36) extends.

Figure 7:
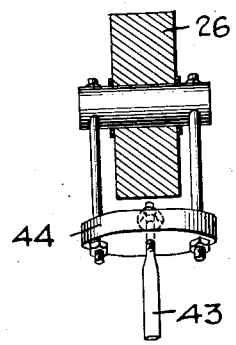
Fig. 7 is a fragmentary view illustrating in detail the anchorage for one of the landing wires of the wing truss.
Figures 5, 6:
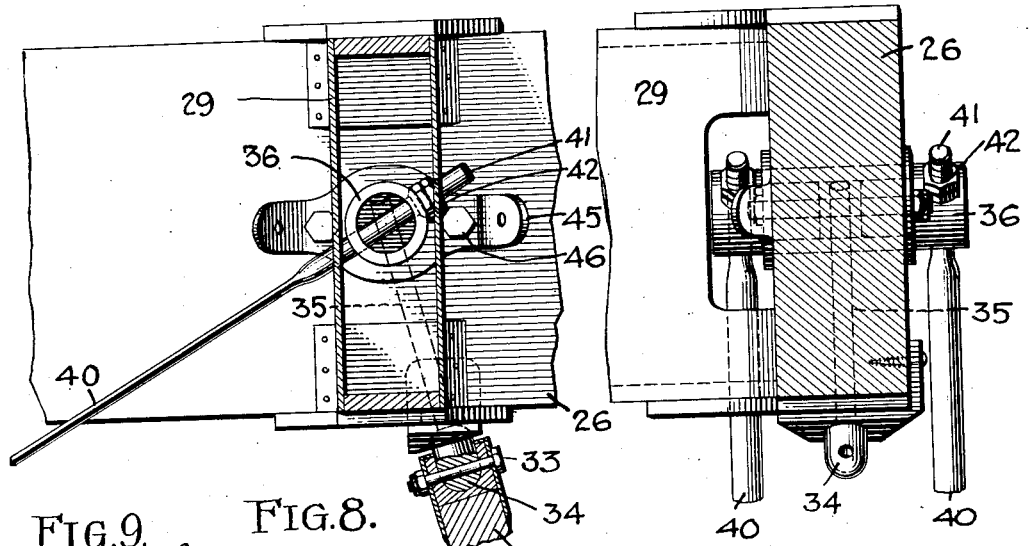
Fig. 5 is a detail sectional view further illustrating said fitting.
Fig. 6 is a sectional view further illustrating said fitting, the section, however, being taken in a plane at right angles to the plane of the section of Fig. 5.
Figure 9:
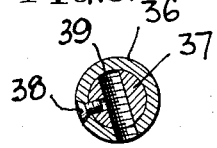
Fig. 9 is a section on the line 9—9 of Fig. 8.
Figure 8:
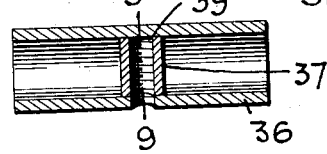
Fig. 8 is a longitudinal sectional view of a detail of said fitting.

The lift wires 40, of which there are preferably two for each wing bay, like the strut fastening bolts 35, are carried directly to the neutral axes of the wing beams. Said wires 40 have rounded ends 41 exteriorly threaded throughout a substantial portion of their length. These rounded ends 41 penetrate the extended portions of the bolt 36 and are fastened thereto by lock nuts 42 which directly engage said bolts. The landing wires 43, there being but one for each bay, instead of being directly anchored to the bolts 36, are directly anchored to a cross fitting 44 in turn directly anchored to said bolts. In Fig. 7 the detail manner in which the landing wires 43 are mounted is clearly shown. As an anchorage for the internal brace wires of the supporting surfaces 22 and 23, each bolt 36 is provided with face plates 45 which bear respectively against the opposite faces of the wing beams. Said face plates 45 are bolted in place as at 46, the bolts in each instance being preferably carried entirely thru the beams.

A wing structure characterized as above set forth embodies in its design interchangeable panels, interchangeable beams and interchangeable struts. Such interchangeability or duplication of parts very appreciably reduces not only the manufacturing cost of the wing structure considered as a whole, but it in addition reduces very appreciably the number of items as spares required to be kept in stock at service station operated to supply the needs of an airplane of a given design.

As a further feature of design, tending to carry out the idea of interchangeability of parts, each wing panel of each supporting surface is provided with an aileron 47 of identical construction, identical form and identical size. Such ailerons 47 are also duplicates of the directional control surfaces of the machine, to wit; the rudder 48 and the elevators 49, such directional control surfaces being elements or items of the empennage. Accordingly, one type of aerofoil or control surface is equally serviceable as a replacement part for a damaged aileron 47, a damaged rudder 48 or a damaged elevator 49. Here again also the production cost of the machine considered as a whole, is greatly reduced as is the cost of maintaining a fully stocked service station for a given design of machine.

The stabilizing fins of the empennage 24, of which there are two horizontal 50 and one vertical 51, like the control surfaces, are identical in form and accordingly require but the one type of beam and the one type of rib as a spare in the event of damage to such part. The ribs of the horizontal fin 50 are designated as 52 and the beams thereof as 53, whereas the ribs of the vertical fin 51 are designated as 54 and the beams thereof as 55.

Figure 10:
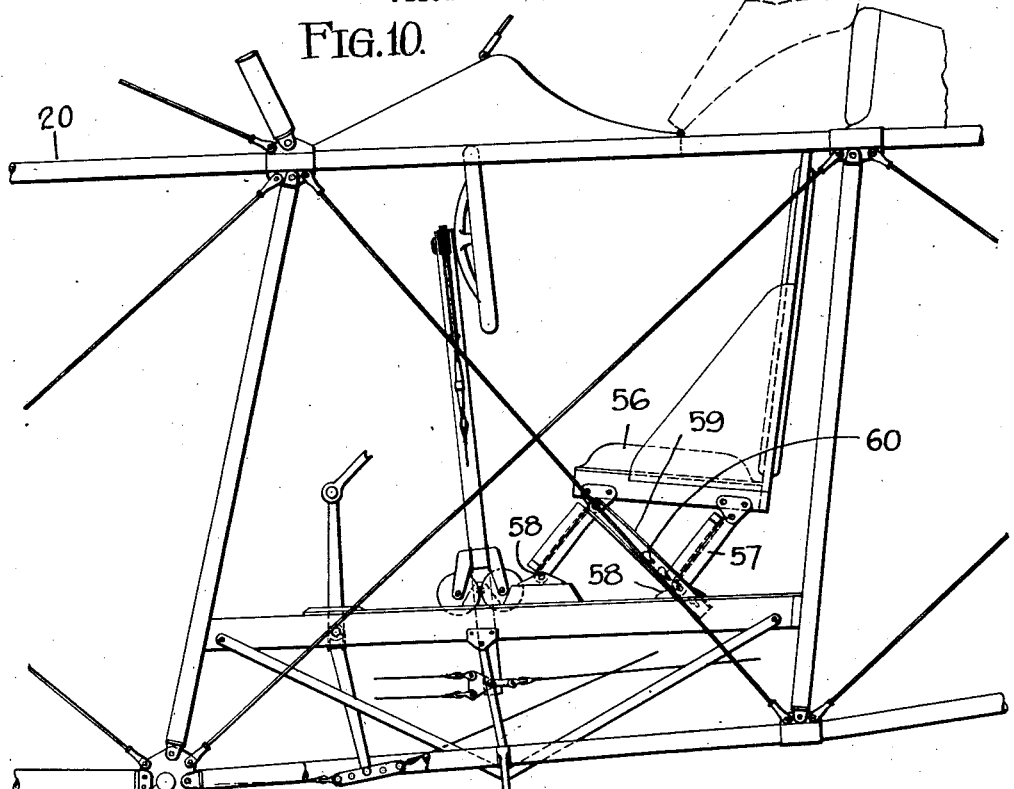
Fig. 10 is a side elevation of a portion of the airplane fuselage, with its outer covering removed, showing in detail the construction of the adjustable seat with which the machine is equipped.
Figure 11:
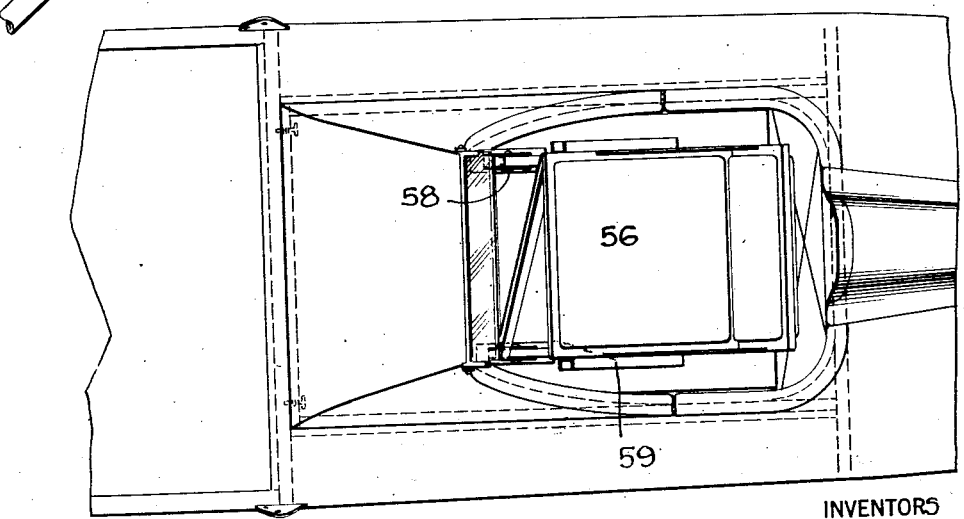
Fig. 11 is a plan view of that portion of the fuselage or body illustrated in Fig. 10.

Referring now to the adjustable seat illustrated in Figs. 10 and 11, 56 designates the seat and 57 the parallel seat supports. The arrangement of the supports 57 is such that they, together with the seat 56, and a line intersecting the axes 58 about which the supports 57 are movable, define a parallelogram, such an arrangement providing for a simultaneous vertical and fore and aft adjustment of the seat. Such adjustment is desirable to the end that occupants of the seat having different physical characteristics may conveniently manipulate the controls. To lock the seat in its adjusted position a bar 59 provided with a series of slots 60 is used. By adjusting said bar 59 relatively to the pivot pin defining the axis 58 of one of the rear seat supports 57, said seat 56 may be retained in any position of adjustment.

From the foregoing, taken in connection with the accompanying drawings, it is obvious that the improvements above described very appreciably reduce the production cost for airplane thus designed, and at the same time simplify and reduce the cost of service. Especially is the machine thus characterized useful commercially. Moreover, in the interest of standardization, spares may be produced in quantity, said spares in many instances being useful as any one of several essentials in the complete design. In conclusion, and with respect to the several wing panels, it should be noted that the beams thereof are all constructed alike, so that the holes therein formed may in one instance be utilized for the attachment of the center struts 61, if the beams are used in connection with the upper panels, and for the attachment of the tanks 62 when used in connection with lower panels. Said tanks 62 are spaced laterally out from the inner ends of the panels a distance equal exactly to the distance of the lateral spacing of the points of attachment for said struts 61.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications and changes.

What we claim is:

1. In an airplane, superposed supporting surfaces, each said supporting surface comprising a like number of panel sections, and each corresponding panel section being the same in surface shape and in dimensions whereby an interchange thereof will in no way alter the design of the airplane considered as a whole.

2. In an airplane, an aerofoil, front and rear beams incorporated in said aerofoil as structural elements thereof, each beam being identical in size, shape and construction, whereby an interchange thereof may be effected without altering in any way the size, shape or design of the aerofoil considered as a whole.

3. In an airplane, superposed supporting surfaces, each said supporting surface comprising a like number of panel sections, each corresponding panel section being the same in surface shape and dimensions whereby an interchange thereof will in no way alter the design of the airplane considered as a whole, and front and rear beams incorporated in said panel sections as structural elements thereof, the beams in each instance being identical in size, shape and construction whereby an interchange thereof may be effected without altering in any way the size, shape or design of said panel sections.

4. In an airplane, superposed supporting surfaces, and a plurality of wing struts interconnecting said supporting surfaces, each strut being identical in size, shape and construction, whereby an interchange thereof may be effected without disturbing in any way the proper spacing of said wings.

5. In an airplane, superposed supporting surfaces, each said supporting surface comprising a like number of panel sections, said panel section being interchangeable and each incorporating as structural elements thereof front and rear beams, said beams being likewise interchangeable, and struts interconnecting said supporting surfaces, said struts being in turn identical in size, shape and construction, whereby an interchange thereof may be effected without disturbing in any way the proper spacing of said wings.

6. In an airplane, superposed supporting surfaces, a plurality of wing struts interconnecting said supporting surfaces, each strut being identical in size, shape and construction, whereby an interchange thereof may be effected without disturbing in any way the proper spacing of said wings, strut fittings at the strut ends, each strut end being reduced and symmetrical in cross-section whereby said strut ends are adapted to engage in said fittings regardless of the placement of said struts.

7. In an airplane, superposed supporting surfaces, each said supporting surface comprising a like number of panel sections, and each corresponding panel section being the same in surface shape and dimensions, whereby an interchange thereof may be effected, beams incorporated in said panel sections as structural elements thereof, said beams being identical in size, shape and construction, whereby an interchange thereof may be effected, struts interconnecting said supporting surfaces, said struts being identical in size, shape and construction, whereby an interchange thereof may be effected.

8. An airplane including a fixed vertical stabilizer surface and a fixed horizontal stabilizer surface, each said surface being of identical profile throughout, and ribs incorporated in said surfaces as structural elements thereof, the ribs in turn being identical in size and interchangeable throughout.

9. An airplane including a fixed vertical stabilizer fin surface and separate fixed horizontal stabilizer surfaces, each said stabilizer surface having a constant profile throughout, and all of said stabilizer surfaces being identical in size and shape, when viewed in plan, and interchangeable.

In testimony whereof we hereunto affix our signatures.

REX B. BEISEL.
WILLIAM L. GILMORE.